C. M. WILSON.
VALVE CONSTRUCTION.
APPLICATION FILED MAY 16, 1917.

1,291,330. Patented Jan. 14, 1919.

Chas. M. Wilson
Inventor

By [signature]
Attorney

UNITED STATES PATENT OFFICE.

CHARLES M. WILSON, OF ELMIRA, NEW YORK.

VALVE CONSTRUCTION.

1,291,330.  Specification of Letters Patent.  Patented Jan. 14, 1919.

Application filed May 16, 1917. Serial No. 168,919.

*To all whom it may concern:*

Be it known that I, CHARLES M. WILSON, a citizen of the United States, residing at Elmira, in the county of Chemung and State of New York, have invented certain new and useful Improvements in Valve Construction, of which the following is a specification.

This invention relates to certain new and useful improvements on the combined turning plug and check valve shown, described and claimed in my Patent Number 1,221,258 issued April 3, 1917.

The present invention is designed to broaden the field of use of my valve construction above referred to for in my previous structure the check valve would close at an inopportune time, in certain applications of the valve, and thereby cause much inconvenience and bother which could only be remedied by resetting the valve parts.

For instance, should my previous valve construction be inserted in the gas or water main in the cellar or other out-of-the-way place, and a faucet or cock turned on in the house, the valve would continue to operate until the flow of the fluid was stopped by shutting off said faucet or cock when the flap valve would seat itself and the locking arm move to operative position. Upon a reopening of the faucet or cock, the fluid would be unable to flow since the flap or check valve had become locked.

The primary aim of this improvement is, therefore, to provide means for holding the check valve inoperative so long as there is working or operating pressure on the fluid in the main, and permitting the check valve to seat itself upon the fluid pressure reaching a certain or predetermined minimum.

The invention further resides in the features of construction and the arrangements and combinations of parts hereinafter described in detail in the following specification, succinctly defined in the appended claims, and illustrated in the accompanying drawing forming a part of this application and wherein:

Figure 1:
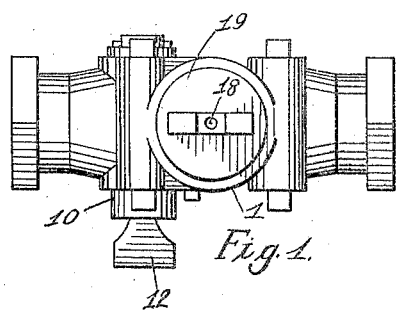
Figure 1 is a top plan view of my improved valve construction.

Referring more in detail to the accompanying drawing and using like characters of reference for corresponding parts throughout, the numeral 1 designates the valve casing having its opposite ends suitably threaded for ready insertion in a gas or water main and formed with a central valve chamber 2 that has communication through port 3 with one end of the casing's conduit 4, and through a valve port 5 with the opposite end of the casing's conduit.

Figure 2:
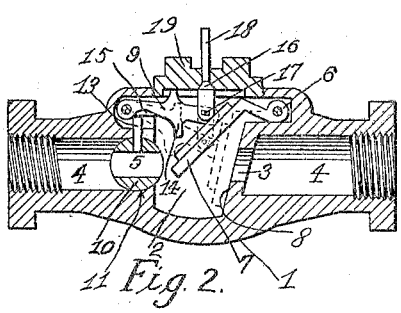
Fig. 2 is a vertical longitudinal section through the valve showing the parts in the position they assume when there is working pressure in the main, and illustrating in dotted lines the relation they take upon a decrease in the pressure below a working pressure.
Figure 4:
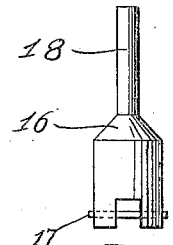
Fig. 4 is an elevation of the auxiliary valve, *per se.*
Figure 3:
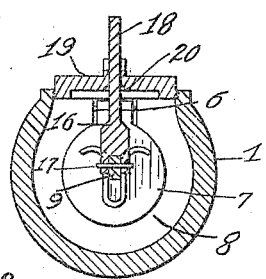
Fig. 3 is a transverse vertical section through the valve construction with the check valve operatively disposed.

Pivoted at 6 within the valve chamber is a check valve 7 that engages on its seat 8 for closing the port 3 when the pressure of the fluid is below normal. A locking arm or lever 9 is pivoted at the opposite side of the valve chamber for normally bearing on the check valve and falling by gravity when the check valve becomes operative, for holding the latter seated, as depicted by the broken lines in Fig. 2.

The port 5 is provided in the turning plug 10, that controls the discharge end of the casing, said plug being turnable in its seat 11 by an integral handle 12. Within the valve chamber the plug carries a cam pin 13 for engaging beneath the locking arm 9 and raising it from locking engagement with the check valve. For accomplishing this result, the arm is formed with a cam projection 14 engageable by said cam pin. The plug has the pin so disposed thereon that when said plug is opened said pin will extend vertically and terminate in proximity to the locking arm. Hence, the latter is formed in its under face with a depression 15 for receiving the pin to permit of said arm moving to its operative position.

The foregoing description briefly sets forth the combined turning plug and check valve constituting the subject matter of my previous patent, the operation of which is as follows:

Upon opening the turning plug 10, the pin 13 will engage lug 14 and raise the arm 9 from its operative position thereby permitting the fluid pressure to swing valve 7 from its seat. Should a valve in some other part of the house be shut off the flow of the fluid will cease even though the pressure remains constant. Under such conditions the check valve will gravitate to its seat and the locking arm will follow to its operative position to so lock the check valve that a subsequent opening of the main will not be affected when said valve, that is located at a distant point, is opened until the locking arm is again manually operated by the pin 13.

This will necessitate extra labor and inconvenience and to overcome such difficulty, I provide a pressure valve 16 of conical design, said valve having its lower end bifurcated and pivotally connected by pin 17 to the lower end of the locking arm 9. The valve is formed with an upwardly extending stem 18 which is guided vertically through an aperture in the closure plate 19 of chamber 2 said opening having its lower end flared to form a valve seat 20.

In practical operation, when the arm 9 is elevated by the opening of turning plug 10 the auxiliary or pressure valve 16 is moved to its seat 20 where it is retained by the fluid pressure within the valve chamber 2. Therefore, the check valve may swing to and from its seat in a free manner without the locking arm dropping into locking engagement therewith. Consequently should a faucet or cock be turned off the locking arm will be retained in its inoperative position as long as the fluid pressure remains constant and regardless of the fluid current.

Now should the fluid pressure fall below the atmospheric pressure the latter will cause the valve 16 to unseat and thereby move the locking arm to its operative position where it will remain until it is again elevated by turning the plug 10.

The foregoing detailed description has been given for clearness of understanding only, it being understood that changes in construction may be resorted to as fall within the scope of the appended claims.

What is claimed is:

1. In a valve construction, a casing having a valve chamber provided with an inlet and outlet, a freely movable check valve operable in the chamber for closing the inlet, a manually operable valve arranged in the outlet and operable independently of the check valve, means movable in the casing independently of the check valve and to a position for holding the check valve seated, pressure-controlled means for holding the first means from said position and means operable by the manually operable valve for moving the first means from operative position and the second means to operative position.

2. In a valve construction, a casing having a valve chamber, a check valve arranged in the chamber for closing the passage through the casing, a locking arm for holding the check valve seated, and a pressure seated valve connected to the arm for holding the latter inoperative.

3. In a valve construction, a casing having a valve chamber having a removable closure formed with a valve seat, a valve engageable with the seat, a check valve operable in the casing to close the passage therethrough, and an arm for locking the check valve closed pivotally connected to said first valve for being retained in its inoperative position when the fluid within the casing is under working pressure.

4. In a valve construction, a valve casing having a valve chamber, a check valve operable therein for closing the passage through the casing, a locking arm adapted to move into locking engagement with the valve to hold the same closed, a closure for the valve chamber having an opening therethrough and a valve seat at the inner end of said opening, and a pressure controlled valve for engaging said seat, said second valve being pivotally connected to the locking arm for holding it inoperative and having a stem extending through the opening of the closure for guiding the valve in its movement.

In testimony whereof I affix my signature.

CHARLES M. WILSON.

Copies of this patent may be obtained for five cents each, by addressing the "Commissioner of Patents, Washington, D. C."